March 19, 1963

R. E. HARRIS 3,081,657

LONGITUDINALLY RECIPROCATING MEASURING MEANS
AND STRIP TREATING APPARATUS

Filed May 6, 1959

INVENTOR.
Robert E. Harris

BY Robert R. Churchill

ATTORNEY

United States Patent Office 3,081,657
Patented Mar. 19, 1963

3,081,657
LONGITUDINALLY RECIPROCATING MEASURING MEANS AND STRIP TREATING APPARATUS
Robert E. Harris, Pittsburgh, Pa., assignor to H. H. Robertson Company, Pittsburgh, Pa., a corporation of Pennsylvania
Filed May 6, 1959, Ser. No. 811,468
9 Claims. (Cl. 83—294)

This invention relates to sheet measuring and marking or cutting apparatus.

The invention has for an object to provide novel and improved apparatus for measuring and marking or cutting successive, uniform lengths of sheets from a continuously moving sheet metal strip during the advance of the strip through the apparatus to produce successive, accurately measured lengths in a rapid, efficient and superior manner.

With this general object in view and such others as may hereinafter appear, the invention consists in the sheet measuring and marking or cutting apparatus and in the various structures, arrangements and combinations of parts hereinafter described and particularly defined in the claims at the end of this specification.

In the drawings illustrating the preferred embodiment of the invention:

In general the present invention contemplates novel apparatus for accurately measuring successive, uniform lengths of a continuously moving steel strip and for marking or cutting the strip during the continuous movement thereof to produce successive, uniform lengths. While the present apparatus may be adapted to mark, notch, punch, cut or otherwise delineate successive, accurately measured uniform lengths, the invention has been herein illustrated as embodying shearing mechanism adapted to be moved along with the strip to produce successive, uniform lengths of sheets from the continuously moving strip.

The present invention is characterized by measuring means actuated by the passage of the strip and control means responsive to the measuring means for first moving and accelerating the shearing mechanism along with the measuring means until it attains substantially the same rate of speed as the sheet and for thereafter effecting clamping of the strip to the shearing mechanism and shearing of the strip in accordance with the measured length whereby to produce successive, uniform measured lengths as will be hereinafter more fully described.

Figure 1:
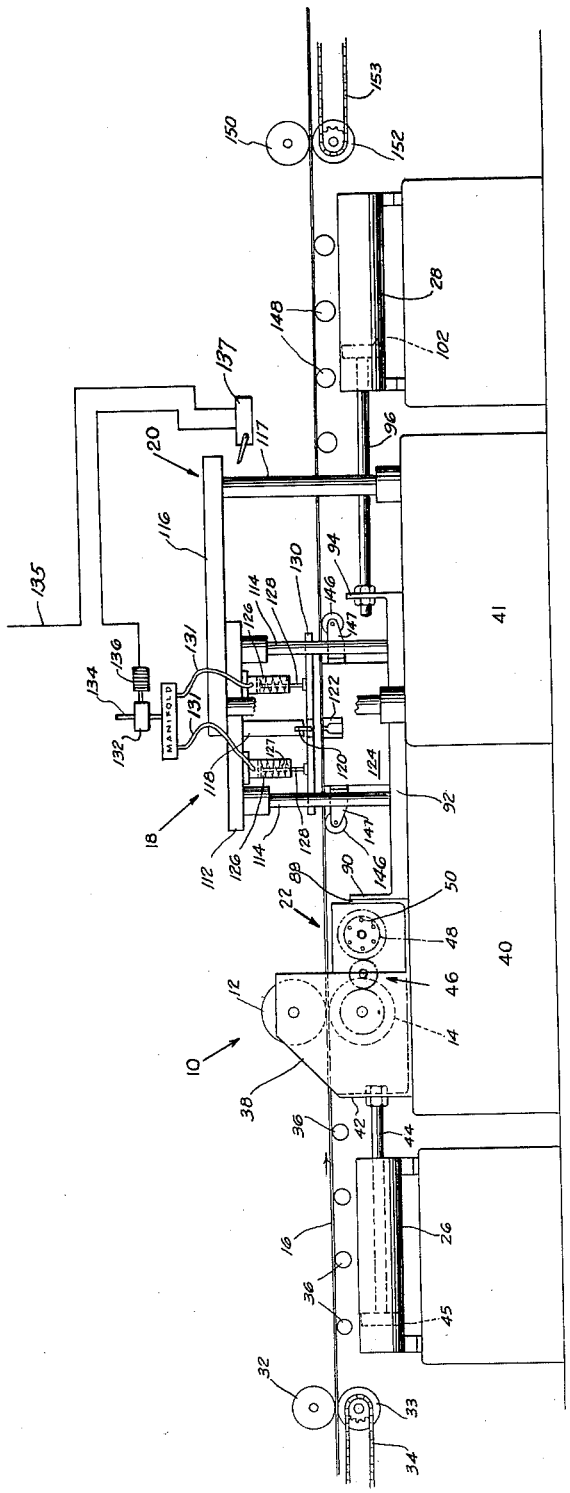
FIG. 1 is a side elevation of sheet measuring and marking or cutting apparatus embodying the present invention.
Figure 2:
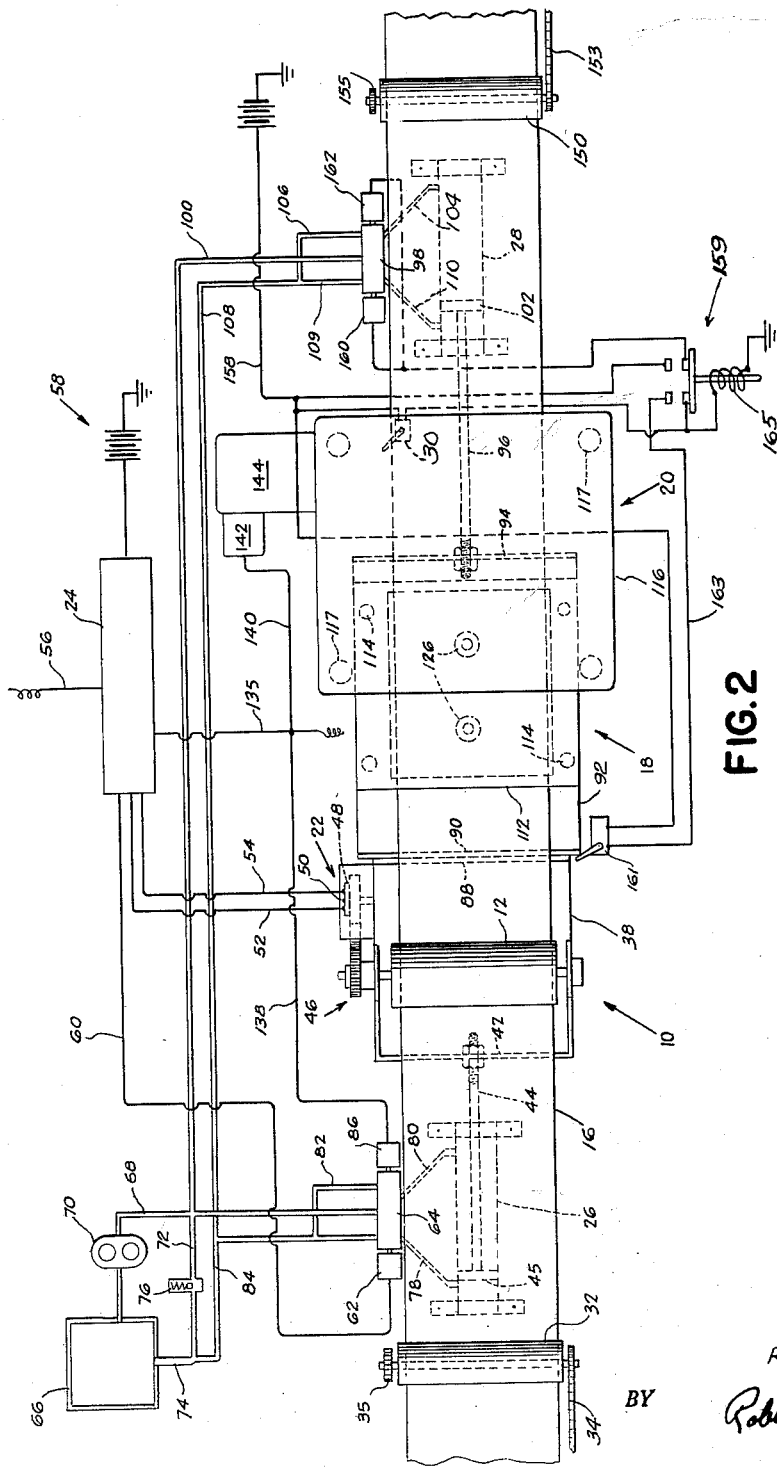
FIG. 2 is a plan view of the same.

Referring now to the drawings, in general the present apparatus, which is more or less diagrammatically illustrated in FIG. 1, includes a linear measuring device 10 which comprises a pair of rollers 12, 14 rotated by the passage of the steel strip 16 therebetween and which is also adapted for longitudinal reciprocation. A longitudinally reciprocable strip clamping and shearing unit indicated generally at 18 is arranged to be moved in a forward direction by the engagement of the measuring device therewith, and a press diagrammatically indicated at 20 is arranged to cooperate with the shearing unit to effect cutting of the strip during the continuous movement thereof. As illustrated in FIG. 2, the control means responsive to the measuring device 10 is operatively connected to a transducer 22 arranged to send electrical impulses proportional to the distance traveled by the strip 16 to an eletcronic counter 24 which is electrically connected to actuate a hydraulic cylinder 26 to effect forward movement of the measuring device in response to a first signal after a predetermined number of impulses is received by the electronic counter. The movement of the measuring device effects forward movement and acceleration of the clamping and shearing unit 18 to attain a speed substantially equal to the speed of travel of the sheet, and after a predetermined number of impulses proportional to the desired cutoff length is received by the electronic counter a second signal effects operation of the clamping and shearing unit 18 and the press 20 to effect the shearing operation. The second signal also effects return of the measuring device 10 to its initial position, and after the cut is made the clamping and shearing unit 18 is returned to its initial position by a second hydraulic cylinder 28 actuated by a limit switch 30 engaged by the unit 18 at the end of its forward stroke.

In practice the sheet metal strip 16 may be delivered to the present apparatus from a machine, not shown, having provision for uncoiling and leveling a strip of steel from a roll thereof, the strip being advanced into the present apparatus by a pair of cooperating feed rollers 32, 33 which may be driven through a chain and sprocket drive 34 from the uncoiling and leveling machine, the rollers being connected by spur gears 35. The strip 16 passes over supporting rollers indicated generally at 36 and then passes between the upper and lower measuring rollers 12, 14. The measuring rollers are mounted for rotation in a longitudinally reciprocable frame 38 which may slide in suitable ways, not shown, formed in a base member 40. An upstanding rear flange 42 of the frame 38 is connected to the piston rod 44 of the hydraulic cylinder 26 to move therewith.

The frictional engagement of the strip 16 with the rollers 12, 14 effects rotation thereof, and the rotation of the lower roll 14 is transmitted through a train of gears 46 forming a part of the transducer 22 which may include a rotary disk 48 having circumferentially spaced contacts 50 which may be engaged with the terminals of leads 52, 54 connected to the electronic counter 24. The transducer 22 diagrammatically indicated herein may comprise any conventional and commercially available mechanism for providing electrical impluses to the electronic counter proportional to the surface measured or the distance traveled by the strip 16. The electronic counter 24 may also comprise a conventional unit for performing the counting and sequencing operations and, as herein shown, is provided with an input signal from a remote programmer, as indicated by the lead 56, the power supply being indicated at 58.

The lead 52 is connected to actuate a first control signal or "accelerator" signal after a predetermined number of impulses has been received by the electronic counter to energize a circuit 60 having a solenoid 62 forming a part of a solenoid operated four-way hydraulic valve 64 operatively connected to the hydraulic cylinder 26. The hydraulic system diagrammatically illustrated herein may include an oil reservoir 66 having a line 68 provided with a motor driven pump unit diagrammatically indicated at 70, the line 68 being connected to the solenoid operated control valve 64. A by-pass line 72 between the line 68 and a return line 74 is provided with an unloading valve diagrammatically indicated at 76. As illustrated in FIG. 2, the piston 44 is in its retracted position to the left at the beginning of a cycle of operation, and when the accelerator signal energizes the solenoid 62, the valve is operated to cause the oil to flow through a line 78 into the cylinder chamber above the piston head 45 to effect movement of the piston to the right, the oil under the piston head being returned to the reservoir 66 through line 80 to the valve 64 and lines 82, 84 from the valve 64 to the return line 74. It will be understood that the opposing solenoid 86 of the four-way valve 64 is deenergized at this time.

As shown in FIG. 1, the frame 38, which carries the measuring rollers 12, 14, is also provided with an upstanding front flange 88 which engages an upstanding rear flange 90 of a frame 92 which carries the clamping and shearing mechanism 18. The frame 92 is also mounted for longitudinal reciprocation in suitable ways, not shown, in the base 40 and in the press base 41, and the frame 92 is also provided with an upstanding front flange 94 which is connected to the piston rod 96 of the second hydraulic cylinder 28. The second hydraulic cylinder may also comprise a double acting unit provided with a solenoid operated valve 98 connected by a line 100 to the pump line 68. However, during the forward movement of the clamping and cutting mechanism 18, the valve 98 is arranged so that no pressure acts on the piston head 102, and in operation the oil in front of the head acts as a cushion, the oil being forced out of the cylinder chamber through a line 104 to the valve chamber, then through a line 106 to a return line 108. The oil thus displaced from the chamber in front of the piston head during the cushioning operation may be freely returned to the cylinder chamber in back of the piston head 102 through the connecting portion 109 of the return line and then through a line 110 connecting the valve 98 to the cylinder 28.

The clamping and shearing unit 18 carried by the frame 92 includes a shear supporting platen 112 carried by upright posts 114 which may be mounted for vertical reciprocation in the frame 92. The posts 114 may be spring pressed upwardly in any usual or preferred manner, not shown, to present the upper surface of the platen 112 against the undersurface of the press platen 116. The platen 112 supports a depending upper die member 118 which carries a shear blade 120 for cooperation with a shearing die 122 supported in a base member 124 mounted on the movable frame member 92. The platen 112 also carries a pair of depending air cylinders 126 provided with pistons 128 connected at their lower ends to a clamping plate 130. The pistons 128 are spring pressed upwardly, as shown, and the cylinders 126 are connected by flexible conduits 131 to a manifold which is connected to a solenoid operated air valve 132. The air valve 132 may be connected by a conduit 134 to a supply of compressed air.

From the description thus far it will be observed that in operation the measuring rolls 12, 14 in frictional and rolling contact with the continuously moving strip 16 being advanced therebetween measures the linear distance traveled by the strip, such distance being accurately indicated by successive measuring impulses transmitted by the transducer 22 to the electronic counter 24. After a predetermined number of impulses proportional to the distance traveled has been received by the electronic counter, as regulated by presetting thereof, the solenoid 62 is energized to effect forward movement and acceleration of the measuring unit 10 and the clamping and shearing unit 18 to a speed approaching the rate of travel of the strip 16. It will also be observed that the measuring rolls 12, 14 continue to measure the linear travel of the strip 16 during the forward movement of the measuring unit 10 since the strip is always traveling faster than the measuring unit, and that during such forward travel the transducer continues to send measuring impulses to the electronic counter but at a relatively slower rate. It will be noted that during the forward movement of the measuring unit 10 and the clamping and shearing unit 18 a fixed distance is maintained therebetween, such distance being a component of the length being measured.

Thereafter, when a predetermined number of additional measuring impulses proportional to the desired cutoff length of a sheet has been received by the electronic counter 24 through the lead 54 a second control signal or "length" signal is arranged to effect: clamping of the strip to the base 124 of the shearing unit; return of the measuring unit 10 to its starting position; and operation of the press 20 to perform the shearing operation. As herein shown, the control circuit includes a lead 135 from the electronic counter 24 to the solenoid 136 of the air valve 132 to energize the solenoid to open the valve and admit air to the cylinders 126. The pistons 128 are thus extended against their springs to effect lowering of the plate 130 and clamping of the strip 16 to the base member 124 of the clamping and shearing unit 18. The control circuit also includes a lead 138 from the electronic counter to the solenoid 86 to shift the control valve 64 to reverse the movement of the measuring unit 10, the solenoid 62 being simultaneously deenergized. The control circuit further includes a lead 140 to the motor control unit 142 for the press drive 144 as herein diagrammatically indicated. The press 20 may be of a conventional type capable of being reciprocated through one cycle of operation, the press platen 116 being supported on upright posts 117 mounted for vertical reciprocation in the press base 41.

Figure 3:
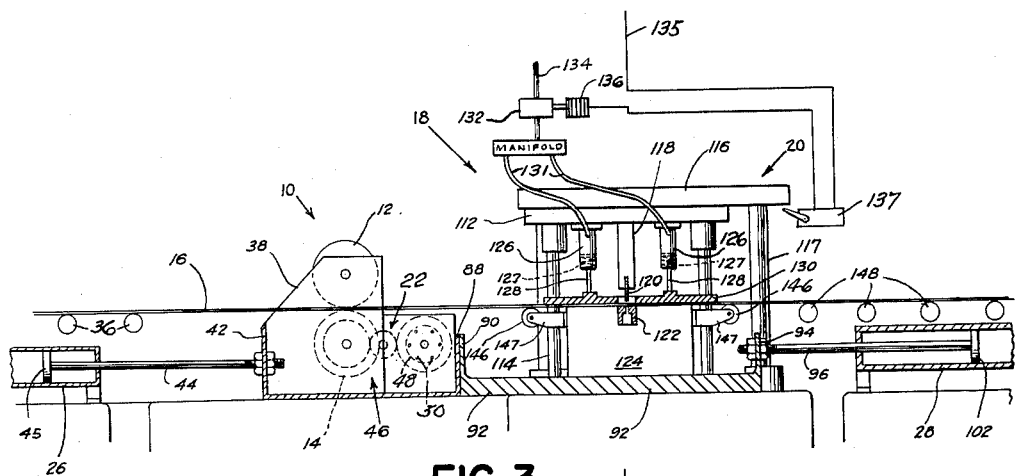
FIGS. 3 and 4 are views partly in cross section of portions of the apparatus shown in FIG. 1 and illustrating the same in different positions of operation.
Figure 4:
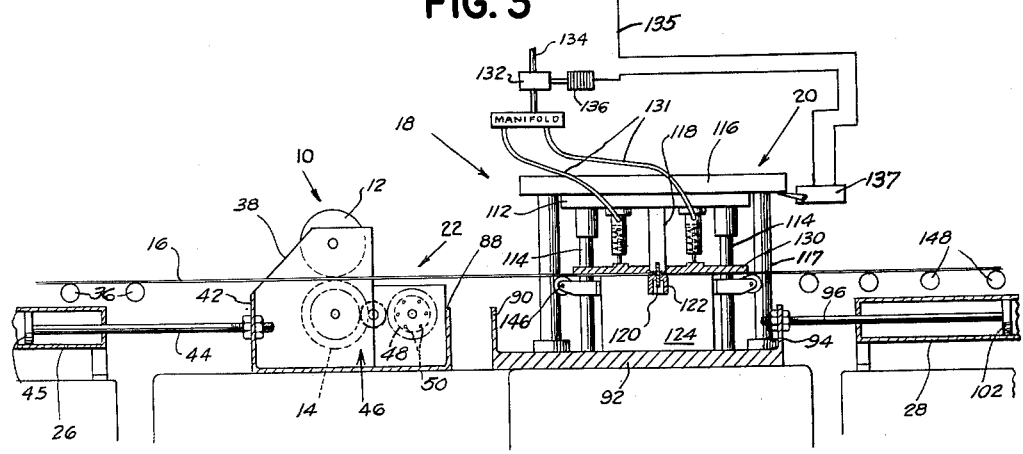

In operation, at the instant the length signal is transmitted to the electronic counter, the measuring device 10 and the clamping and shearing device 18 are traveling together with a fixed distance between a vertcial center line through the rollers 12, 14 and a vertical center line through the shear blade 120; a metered length of the continuous strip 16 has passed the measuring unit 10 and the clamping and shearing unit 18; and the sliding units have almost, but not quite, attained the exact speed of the continuous strip. As illustrated in FIG. 3, at this time the clamping plate 130 is activated to physically connect the shearing unit to the continuous strip 16. After physical connection of the clamping and shearing unit 18 to the strip is accomplished, the unit 18 will be advanced by the faster moving strip to which it is connected and will separate from the measuring device 10, as shown in FIG. 4, the measuring device being returned to its initial position by the action of the hydraulic cylinder 26 as described. The clamping and shearing unit 18 will continue in clamping engagement with the strip until the press 20 completes its shearing operation, as shown in FIG. 4, whereupon the clamping and shearing unit will be disengaged from the strip during the upstroke of the press unit 20. The circuit to the solenoid 136 includes a normally closed limit switch 137 having an arm extended into the path of the press platen 116. Thus, in operation, when the press arrives at its lowermost position the circuit is opened at the switch 137 to deenergize the solenoid, thus shifting the valve 132 and permitting elevation of the clamping plate 130 by the springs 127. It will be noted that since the movable measuring device 10 and the shearing mechanism 18 moved thereby remain in the same relative position to each other until the clamping mechanism or shearing blade has engaged the continuous strip, the possibility of mechanical error in surface measuring and cutting is reduced to a minimum. When the clamping and shearing unit 18 reaches its extreme forward movement, a portion of the frame 92 thereof will engage and close the limit switch 30 which forms part of a circuit 158 to the solenoids 160, 162 for actuating the valve 98 to effect positive return of the piston 102 and the clamping and shearing unit 18 to its starting position in readiness for a succeeding cycle of operation. The circuit 158 includes a holding circuit indicated generally at 159, and a normally closed return limit switch 161. In operation when the normally open switch 30 is closed by engagement of the forward end of frame 92, the holding relay 159 will be energized, the circuit being continued through the normally closed switch 161 and lead 163 to the relay solenoid 165. Thereafter, when the clamping and shearing unit 18 is returned to its retracted position, the opposite end of the frame 92 will open the circuit at switch 161 to deenergize the solenoid 165. It will be understood that when the control circuit 158 to the solenoids 160, 162 is deenergized the hydraulic cylinder 28 is rendered inactive, and that during the next cycle of operation the piston 102 thereof is driven forward or to the right by the forward movement of the shearing mechanism to serve as a cushioning device.

During its advance through the apparatus the continuous strip 16 may be supported by rollers 146 mounted in brackets 147 carried by the movable base member 124, and by supporting rollers 148, the leading end of the strip being received between upper and lower discharge rollers 150, 152 which may be driven at a relatively faster rate than the advance of the strip so that when the strip is cut, the cut sheet may be advanced out of the way of the oncoming strip. The discharge rollers 150, 152 may be driven by a motor, not shown, through a chain and sprocket drive 153 and through cooperating spur gears indicated at 155. It will be noted that as soon as the length signal is produced the measuring rolls start a new measuring cycle during the return of the measuring unit 10 to its starting position. In other words, the rolls 12, 14 are always in measuring contact with the strip and continue to produce measuring impulses during the forward and retracting movements relative to the strip as well as when the rolls are stationary relative to the strip. It will also be observed that the rolls are at all times rotated in one direction only, the upper roll 12 rotating in a counterclockwise direction and the lower roll 14 rotating in a clockwise direction.

From the above description of the preferred embodiment of the invention and the mode of operation thereof, it will be seen that the invention is characterized by measuring means actuated by the advance of the material through the apparatus, and control means responsive to the measuring means arranged to first advance and accelerate the shearing mechanism until the latter attains substantially the same speed as the material, and when a predetermined length has been indicated by the measuring means the shearing mechanism is positively clamped to the material to travel therewith during the shearing operation whereby successive uniform lengths of sheets may be produced. It will be observed that the present apparatus may also be used with advantage for marking, notching, punching or otherwise delineating successive, accurately measured uniform lengths on a continuously moving strip by merely substituting the appropriate tools for the shearing mechanism illustrated herein.

It will also be apparent that in a modified form of the invention the clamping mechanism, including the clamping plate 130, may be omitted, if desired, since the engagement of the shear blade 120 itself, or other length delineating tool, with the strip will physically connect or clamp the length delineating means with the strip to effect movement of such means with the continuously moving strip.

While the preferred embodiment of the invention has been herein illustrated and described, it will be understood that the invention may be embodied in other forms within the scope of the following claims.

Having thus described the invention, what is claimed is:

1. Apparatus of the character described having in combination:
    means for supporting and continuously advancing an elongated strip of sheet metal;
    working means adapted to perform work upon said strip, said working means being mounted for reciprocation longitudinally of said strip;
    linear measuring means engaged in measuring relation with the advancing strip and positioned prior to said working means in normally abutting relation therewith, said linear measuring means also being mounted for reciprocation longitudinally of said strip;
    first drive means for advancing said measuring means and abutting working means at accelerated speeds;
    first control means responsive to said measuring means for
        (1) actuating said first drive means when a predetermined length less than a desired cutoff length is measured; and thereafter
        (2) retracting said measuring means when the desired cutoff length is measured and simultaneously actuating said working means into engagement with said advancing strip whereby said advancing working means continues to advance at the speed of and under the motive power of said advancing strip while performing work thereon,
    second drive means for retracting said working means into abutment with said linear measuring means after said work has been performed;
    and second control means for actuating said second drive means;
    said linear measuring means remaining at all times in measuring relation with said continuously advancing strip and continuously measuring the advance of said strip during reciprocation.

2. Apparatus of the character described having in combination:
    means for supporting and continuously advancing an elongated strip of sheet metal;
    shearing means mounted for reciprocation longitudinally of said strip;
    linear measuring means engaged in measuring relation with the advancing strip and positioned prior to said shearing means in normally abutting relation therewith, said linear measuring means also being mounted for reciprocation longitudinally of said strip;
    first drive means for advancing said measuring means and abutting shearing means at accelerated speeds;
    first control means responsive to said measuring means for
        (1) actuating said first drive means when a predetermined length less than a desired cutoff length is measured; and thereafter
        (2) retracting said measuring means when the desired cutoff length is measured and simultaneously actuating said advancing shearing means into engagement with said advancing strip whereby said shearing means continues to advance at the speed of and under the motive power of said advancing strip;
    second drive means for retracting said shearing means into abutment with said linear measuring means;
    and second control means for actuating said second drive means;
    said linear measuring means remaining at all times in measuring relation with said continuously advancing strip and continuously measuring the advance of said strip during reciprocation.

3. Apparatus of the character described having in combination;
    means for supporting and continuously advancing an elongated strip of sheet metal;
    unitary clamping and shearing means mounted for reciprocation longitudinally of said strip;
    linear measuring means engaged in measuring relation with the advancing strip and positioned prior to said unitary clamping and shearing means in normally abutting relation therewith, said linear measuring means also being mounted for reciprocation longitudinally of said strip;
    first drive means for advancing said measuring means and abutting unitary clamping and shearing means at accelerated speeds;
    first control means responsive to said measuring means for
        (1) actuating said first drive means when a predetermined length less than a desired cutoff length is measured; and thereafter (2) retracting said measuring means when the desired cutoff length is measured and simultaneously actuating said advancing unitary clamping and shearing means into engagement with said advancing strip whereby said unitary clamping and shearing means continues to advance at the speed of and under the motive power of said advancing strip; and thereafter (3) actuating said unitary clamping and shearing means to sever said advancing strip; and thereafter (4) disengaging said clamping and shearing means from said advancing strip;

second drive means for retracting said unitary clamping and shearing means into abutment with said linear measuring means;

and second control means for actuating said second drive means;

said linear measuring means remaining at all times in measuring relation with said continuously advancing strip and continuously measuring the advance of said strip during reciprocation.

4. Apparatus as defined in claim 2 which includes a press cooperating with said shearing means and actuated by said control means to effect the shearing operation.

5. Apparatus as defined in claim 1 wherein the measuring means remains in measuring contact with the continuously moving strip and continues its measuring function during reciprocation thereof, a new length measuring cycle being started simultaneously with the indication of one measured length and as the measuring device is being returned to its starting position.

6. Apparatus as defined in claim 1 wherein the measuring device comprises a pair of rolls arranged to be rotated by the continuously advancing strip passing therebetween, and wherein the control means comprises an electrical circuit including a transducer operatively connected to one of said rolls and arranged to transmit impulses proportional to the length measured by the rolls, and an electronic counter operatively connected to the transducer to receive said impulses.

7. Apparatus as defined in claim 2 wherein the first drive means includes a hydraulic cylinder operatively connected to the measuring means and provided with a solenoid operated valve included in said circuit and connected to said electronic counter, said solenoid operated valve being actuated to effect forward movement and acceleration of the measuring means and the shearing means by said cylinder upon transmission of a predetermined number of impulses to the counter less than a number indicating the cutoff length, said solenoid operated valve being thereafter actuated to effect return of the measuring means to its starting position by said cylinder upon transmission of a predetermined number of impulses to the electronic counter proportional to the cutoff length.

8. Apparatus as defined in claim 2 wherein the second drive means for returning the shearing means to its starting position comprises a second hydraulic cylinder operatively connected thereto and which is also provided with a solenoid operated valve included in a second circuit, said second hydraulic cylinder being inactive during the forward movement of the shearing unit to provide a cushioning effect during said forward movement, and a limit switch in said second circuit arranged to be closed upon completion of the shearing operation to actuate said second cylinder to effect return of the shearing unit to its starting position.

9. Apparatus as defined in claim 2 which includes means subsequent to said shearing means for engaging and rapidly advancing successive cut sheets.

References Cited in the file of this patent
UNITED STATES PATENTS

| | | |
|---|---|---|
| 1,859,785 | Messinger | May 24, 1932 |
| 1,936,928 | Batchelor | Nov. 28, 1933 |
| 2,272,408 | Hickman | Feb. 10, 1942 |
| 2,301,236 | Yoder | Nov. 10, 1942 |
| 2,529,161 | Kelling | Nov. 7, 1950 |
| 2,641,042 | Kopp | June 9, 1953 |
| 2,716,818 | Fitler | Sept. 6, 1955 |
| 2,540,166 | Frank et al. | Feb. 6, 1961 |
| 3,040,609 | Bowman | June 26, 1962 |